(12) United States Patent
Mellet et al.

(10) Patent No.: US 9,618,087 B2
(45) Date of Patent: Apr. 11, 2017

(54) AUTOMATIC TRANSMISSION GEAR AND CLUTCH ARRANGEMENT

(71) Applicant: GM Global Technology Operations LLC, Detroit, MI (US)

(72) Inventors: Edward W. Mellet, Rochester Hills, MI (US); James M. Hart, Belleville, MI (US); Daryl A. Wilton, Macomb, MI (US); Vijay A. Neelakantan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 13/916,150

(22) Filed: Jun. 12, 2013

(65) Prior Publication Data

US 2013/0337963 A1    Dec. 19, 2013

Related U.S. Application Data

(60) Provisional application No. 61/659,787, filed on Jun. 14, 2012.

(51) Int. Cl.
*F16H 3/62* (2006.01)
*F16H 3/66* (2006.01)

(52) U.S. Cl.
CPC .............. *F16H 3/62* (2013.01); *F16H 3/66* (2013.01); *F16H 2200/0069* (2013.01); *F16H 2200/2012* (2013.01); *F16H 2200/2046* (2013.01)

(58) Field of Classification Search
CPC .............................................. F16H 2200/0069
See application file for complete search history.

(56) References Cited

U.S. PATENT DOCUMENTS

| | | |
|---|---|---|
| 4,033,203 A | 7/1977 | Hirosawa et al. |
| 4,676,116 A | 6/1987 | Nerstad et al. |
| 6,558,287 B2 | 5/2003 | Hayabuchi et al. |
| 6,837,823 B2 | 1/2005 | Lee et al. |
| 6,852,059 B2 | 2/2005 | Lee et al. |
| 6,960,146 B2 | 11/2005 | Haka |
| 6,960,149 B2 | 11/2005 | Ziemer |
| 7,011,597 B2 | 3/2006 | Haka |
| 7,014,589 B2 | 3/2006 | Stevenson |
| 7,101,305 B2 | 9/2006 | Tabata et al. |
| 7,128,683 B2 | 10/2006 | Oguri et al. |
| 7,163,484 B2 | 1/2007 | Klemen |
| 7,497,802 B2 | 3/2009 | Kamm et al. |
| 7,670,246 B2 | 3/2010 | Kamm et al. |
| 7,699,741 B2 | 4/2010 | Hart et al. |
| 7,704,180 B2 | 4/2010 | Wittkopp et al. |
| 7,736,260 B2 | 6/2010 | Hart et al. |
| 7,736,264 B2 | 6/2010 | Moorman et al. |
| 7,775,931 B2 | 8/2010 | Carey et al. |

(Continued)

*Primary Examiner* — Justin Holmes
*Assistant Examiner* — Timothy M Hannon

(57) ABSTRACT

A transmission is provided having an input member, an output member, four planetary gear sets, a four coupling members and a six torque-transmitting mechanisms. Further, a hydraulic fluid control circuit is provided for controlling the operation of the plurality of torque-transmitting devices. The hydraulic fluid control circuit receives pressurized hydraulic fluid from an off-axis hydraulic fluid pump and has a plurality of fluid passages disposed in the transmission house, input member and other coupling members.

32 Claims, 6 Drawing Sheets

(56) References Cited

U.S. PATENT DOCUMENTS

| | | |
|---|---|---|
| 7,785,225 B2 | 8/2010 | Phillips et al. |
| 7,841,960 B2 | 11/2010 | Baldwin |
| 8,075,441 B2 | 12/2011 | Hart et al. |
| 8,105,196 B2 | 1/2012 | Portell et al. |
| 8,545,362 B1 * | 10/2013 | Goleski et al. ............... 475/277 |
| 2005/0090362 A1 | 4/2005 | Abe et al. |
| 2006/0019791 A1 | 1/2006 | Baldwin |
| 2006/0270513 A1 | 11/2006 | Klemen |
| 2006/0270514 A1 | 11/2006 | Oguri et al. |
| 2006/0270516 A1 | 11/2006 | Klemen |
| 2007/0026990 A1 | 2/2007 | Takagi |
| 2007/0225108 A1 | 9/2007 | Kamm et al. |
| 2007/0232437 A1 | 10/2007 | Kamm et al. |
| 2008/0009384 A1 | 1/2008 | Diosi et al. |
| 2008/0015081 A1 | 1/2008 | Kamm et al. |
| 2008/0064556 A1 | 3/2008 | Kamm et al. |
| 2008/0171627 A1 | 7/2008 | Wittkopp et al. |
| 2008/0227587 A1 | 9/2008 | Carey et al. |
| 2008/0261763 A1 | 10/2008 | Phillips et al. |
| 2008/0300093 A1 | 12/2008 | Borgerson |
| 2009/0209388 A1 | 8/2009 | Carey et al. |
| 2009/0209390 A1 | 8/2009 | Carey et al. |
| 2009/0209391 A1 | 8/2009 | Carey et al. |
| 2009/0215581 A1 | 8/2009 | Carey et al. |
| 2009/0215582 A1 | 8/2009 | Carey et al. |
| 2009/0247343 A1 | 10/2009 | Hart et al. |
| 2009/0264239 A1 | 10/2009 | Carey et al. |
| 2009/0264240 A1 | 10/2009 | Carey et al. |
| 2009/0264242 A1 | 10/2009 | Carey et al. |
| 2009/0264245 A1 | 10/2009 | Carey et al. |
| 2009/0264246 A1 | 10/2009 | Carey et al. |
| 2010/0144486 A1 | 6/2010 | Hart et al. |
| 2010/0279811 A1 * | 11/2010 | Portell et al. ................. 475/116 |
| 2010/0279814 A1 * | 11/2010 | Brehmer et al. ............... 475/275 |
| 2011/0053725 A1 * | 3/2011 | Hart et al. ..................... 475/116 |
| 2011/0136615 A1 * | 6/2011 | Phillips et al. ................ 475/282 |

\* cited by examiner

AUTOMATIC TRANSMISSION GEAR AND CLUTCH ARRANGEMENT

CROSS-REFERENCE TO RELATED APPLICATIONS

This nonprovisional application claims the benefit of U.S. Provisional Application No. 61/659,787, filed on Jun. 14, 2012, which is hereby incorporated in its entirety herein by reference.

FIELD

The present invention relates generally to multiple speed transmissions having a plurality of planetary gear sets and a plurality of torque-transmitting devices and more particularly to a hydraulic control circuit for controlling the operation of the plurality of torque-transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved control systems is essentially constant. More efficient hydraulic controls require less energy and provide improved performance, weight efficiency and driver satisfaction. Accordingly, there is a need for an improved, cost-effective, compact multiple speed transmission.

SUMMARY

A transmission is provided having a transmission housing, a first, a second, a third, and a fourth planetary gear sets each having a first, a second, and a third members, an input and output members rotatably supported by the transmission housing, four interconnecting members each continuously interconnecting one of the first, second, and third members of the planetary gear sets with another of the first, second, and third members of the planetary gear sets, an intermediate member rotatably supported by the one of the four interconnecting members, and six torque transmitting mechanisms each selectively interconnecting at least one of the first, second, and third members of the planetary gear sets with at least another of the first members, second members, third members of the planetary gear sets, the intermediate member, or the transmission housing. The input member continuously interconnected with the second member of the second planetary gear set. The output member continuously interconnected to the second member of the fourth planetary gear set. The torque transmitting mechanisms are selectively engageable in combinations of at least three to establish ten forward speed ratios and at least one reverse speed ratio between the input member and the output member.

In one example of the present invention, a first of the four interconnecting members continuously interconnects the first member of the first planetary gear set with the first member of the second planetary gear set. A second of the four interconnecting members continuously interconnects the second member of the first planetary gear set with the third member of the fourth planetary gear set. A third of the four interconnecting members continuously interconnects the third member of the second planetary gear set with the first member of the third planetary gear set. A fourth of the four interconnecting members continuously interconnects the third member of the third planetary gear set with the first member of the fourth planetary gear set.

In another example of the present invention, a first of the six torque transmitting mechanisms is selectively engageable to interconnect at least one of the first member of the first planetary gear set and the first member of the second planetary gear set with the transmission housing. A second of the six torque transmitting mechanisms is selectively engageable to interconnect the third member of the first planetary gear set with the transmission housing. A third of the six torque transmitting mechanisms is selectively engageable to interconnect at least one of the second member of the second planetary gear set and the input member with the first member of the fourth planetary gear set. A fourth of the six torque transmitting mechanisms is selectively engageable to interconnect at least one of the third member of the second planetary gear set and the first member of the third planetary gear set with the intermediate member. A fifth of the six torque transmitting mechanisms is selectively engageable to interconnect the second member of the third planetary gear set with the intermediate member. A sixth of the six torque transmitting mechanisms is selectively engageable to interconnect at least one of the second member of the first planetary gear set and the third member of the fourth planetary gear set with the intermediate member.

In yet another example of the present invention, each of the six torque transmitting mechanisms include a clutch pack and an actuating assembly. The actuating assembly of the first of the six torque transmitting mechanisms includes a piston, an apply chamber, and a dam spring. The actuating assembly of the second of the six torque transmitting mechanisms includes a piston, a first apply chamber, a second apply chamber, and a dam chamber. The actuating assemblies of the third, fourth, fifth, and sixth of the six torque transmitting mechanisms each include a piston, an apply chamber, and a dam chamber.

In yet another example of the present invention, the transmission housing includes a front portion, a center portion, and a rear portion. The actuating assembly of the first of the six torque transmitting mechanisms is supported by the center portion. The actuating assembly of the second of the six torque transmitting mechanisms is supported by the rear portion.

In yet another example of the present invention, the center portion of the transmission housing includes an apply passage in communication with the apply chamber of the first of the six torque transmitting mechanisms. The rear portion of the transmission housing includes a first apply passage in communication with the first apply chamber of the second of the six torque transmitting mechanisms, a second apply passage in communication with the second apply chamber of the second of the six torque transmitting mechanisms, and a dam passage in communication with the dam chamber of the second of the six torque transmitting mechanisms.

In yet another example of the present invention, the front portion of the transmission housing includes a first, second, third, and fourth apply passages and a dam passage. The fourth apply passage is in communication with the apply chamber of the third of the six torque transmitting mechanisms. The dam passage is in communication with the dam chamber of the third of the six torque transmitting mechanisms.

In yet another example of the present invention, the input member includes a first, second, and third apply passages and a dam passage. The first apply passage of the input member is in communication with each of the first apply passage of the front portion of the transmission housing and the apply chamber of the fourth of the six torque transmitting mechanisms. The second apply passage of the input member is in communication with each of the second apply passage of the front portion of the transmission housing and the apply chamber of the fifth of the six torque transmitting mechanisms. The third apply passage of the input member is in communication with each of the third apply passage of the front portion of the transmission housing and the apply chamber of the sixth of the six torque transmitting mechanisms. The dam passage of the input member is in communication with each of the dam passage of the front portion of the transmission housing and the dam chambers of each of the fourth, fifth, and sixth of the six torque transmitting mechanisms.

In yet another example of the present invention, the input member includes a first, a second, a third, and a fourth bores disposed parallel to a longitudinal axis of the input member, a first clutch port in communication with the apply chamber of the fourth of the six torque-transmitting mechanisms and the first bore of the input member, a second clutch port in communication with the apply chamber of the fifth of the six torque-transmitting mechanisms and the second bore of the input member, a third clutch port in communication with the apply chamber of the sixth of the six torque-transmitting mechanisms and the third bore of the input member, and a first, second, and third dam ports in communication with the dam chambers of the fourth, fifth, and sixth of the six torque-transmitting mechanisms, respectively, and the fourth bore of the input member.

In yet another example of the present invention, the multi-speed transmission further includes a sleeve shaft supported by the front portion of the transmission housing, a plurality of input member seals, a first annular channel, a second annular channel, a third annular channel, and a fourth annular channel. The annular channels are defined by the inner surface of the sleeve shaft, the outer surface of the input member, and the plurality of input member seals. The first annular channel communicates with the first bore of the input member through a first port. The second annular channel communicates with the second bore of the input member through a second port. The third annular channel communicates with the third bore of the input member through a third port. The fourth annular channel communicates with the fourth bore of the input member through a fourth port.

In yet another example of the present invention, the multi-speed transmission further includes a hydraulic fluid pump fixed to the transmission housing and drivingly connected to a torque converter pump.

In yet another example of the present invention, the multi-speed transmission further includes a first, second, and third speed sensor assembly each having a sensor and a ring, the sensor of the first speed sensor assembly is disposed on the transmission housing and the ring of the first speed sensor assembly is fixed to the input member, the sensor of the second speed sensor assembly is disposed on the center portion of the transmission housing and the ring of the second speed sensor assembly is fixed to the first of the four interconnecting members, and the sensor of the third speed sensor assembly is disposed on the rear portion of the transmission housing and the ring of the third speed sensor assembly is fixed to the output member.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1A:
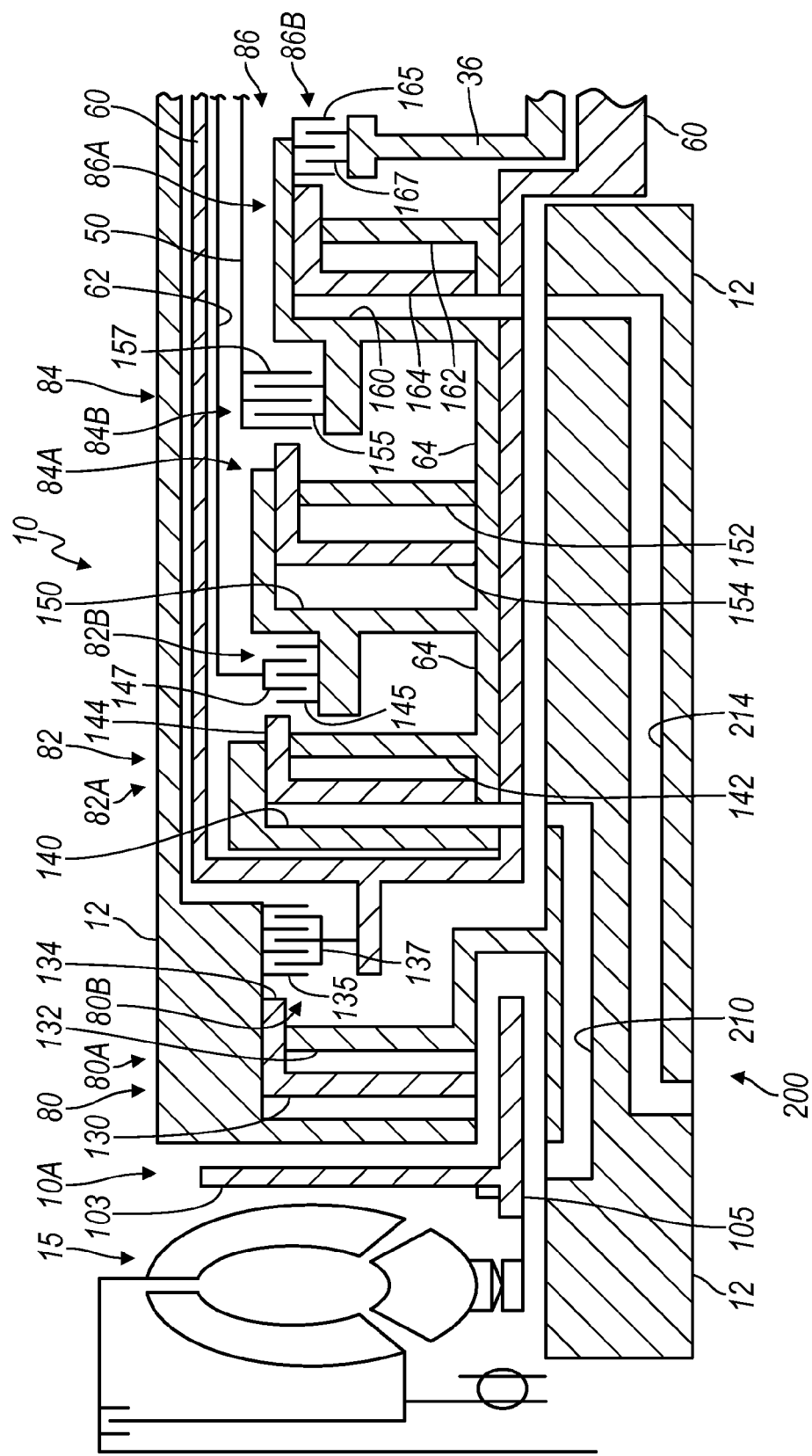
FIG. 1A is a schematic cross-sectional view of a front portion of an embodiment of a ten speed transmission according to the present invention.
Figure 1A:
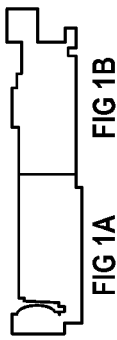
Figure 1B:
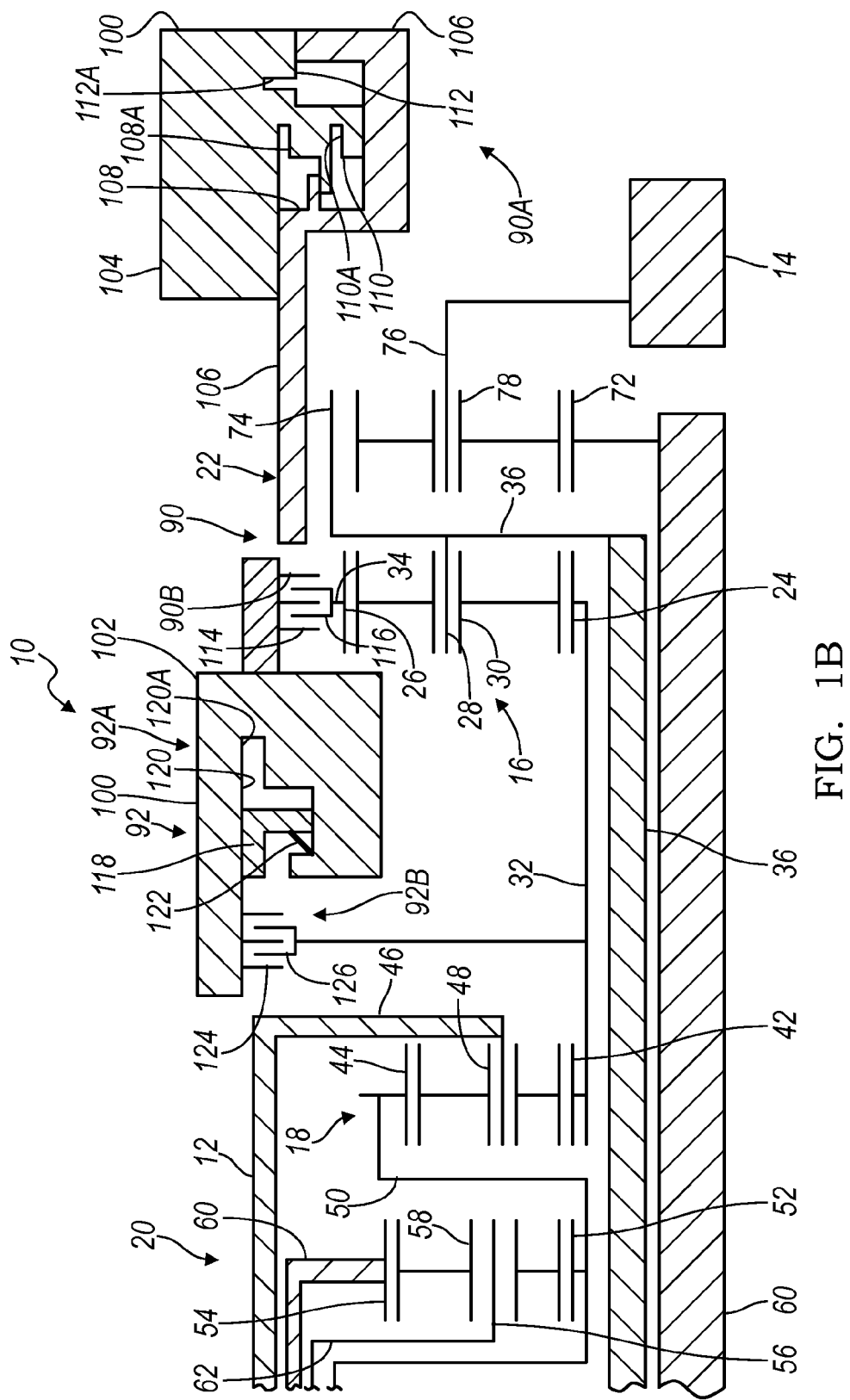
FIG. 1B is a schematic cross-sectional view of a rear portion of an embodiment of a ten speed transmission according to the present invention.

Referring to the drawings, wherein like reference numbers refer to like components, in FIGS. 1A and 1B a multi-speed transmission 10 is illustrated. The transmission 10 includes an input shaft or member 12 and an output shaft or member 14. The input shaft or member 12 is connected to an engine (not shown) through a torque converter and locking clutch assembly 15. The output shaft 14 is continuously connected with the final drive unit or transfer case (not shown).

In a preferred embodiment of the present invention, the transmission 10 includes four planetary gear sets 16, 18, 20 and 22. The planetary gear sets 16, 18, 20 and 22 are connected between the input shaft or member 12 and the output shaft 14.

The first planetary gear set 16 includes a sun gear member 24, a ring gear member 26 and a carrier member 28 that rotatably supports a set of planet gears 30. Sun gear member 24 is connected for common rotation with a first shaft or interconnecting member 32. Ring gear member 26 is connected for common rotation with a second shaft or interconnecting member 34. Carrier member 28 is connected for common rotation with a third shaft or member 36. Planet gears 30 are each configured to intermesh with both the sun gear member 24 and the ring gear member 26.

The second planetary gear set 18 includes a sun gear member 42, a ring gear member 44 and a carrier member 46 that rotatably supports a set of planet gears 48. Sun gear member 42 is connected for common rotation with the first shaft or interconnecting member 32. Ring gear member 44 is connected for common rotation with a fourth shaft or interconnecting member 50. Carrier member 46 is connected for common rotation with the input shaft or member 12. Planet gears 48 are each configured to intermesh with both the sun gear member 42 and the ring gear member 44.

The third planetary gear set 20 includes a sun gear member 52, a ring gear member 54 and a carrier member 56 that rotatably supports a set of planet gears 58. Sun gear member 52 is connected for common rotation with the fourth shaft or interconnecting member 50. Ring gear member 54 is connected for common rotation with a fifth shaft or interconnecting member 60. Carrier member 56 is connected for common rotation with a sixth shaft or interconnecting member 62. Planet gears 58 are each configured to intermesh with both the sun gear member 52 and the ring gear member 54.

The fourth planetary gear set 22 includes a sun gear member 72, a ring gear member 74 and a carrier member 76 that rotatably supports a set of planet gears 78. Sun gear member 72 is connected for common rotation with the fifth shaft or interconnecting member 60. Ring gear member 74 is connected for common rotation with the third shaft or interconnecting member 36. Carrier member 76 is connected for common rotation with the output shaft 14. Planet gears 78 are each configured to intermesh with both the sun gear member 72 and the ring gear member 74.

The transmission 10 includes a variety of torque-transmitting mechanisms or devices allowing for selective coupling of shafts or interconnecting members, members of the planetary gear sets and the transmission housing 100. More specifically, transmission 10 includes a first clutch 80, a second clutch 82, a third clutch 84, a fourth clutch 86, a first brake 90, and a second brake 92. For example, first clutch 80 is selectively engageable to connect the fifth shaft or interconnecting member 60 to the input shaft or member 12. Second clutch 82 is selectively engagable to connect the seventh shaft or interconnecting member 64 to the sixth shaft or interconnecting member 62. Third clutch 84 is selectively engagable to connect the fourth shaft or interconnecting member 50 to the seventh shaft or interconnecting member 64. Fourth clutch 86 is selectively engageable to connect the third shaft or interconnecting member 36 to the seventh shaft or interconnecting member 64. First brake 90 is selectively engagable to connect the second shaft or interconnecting member 34 to the transmission housing 100 to restrict rotation of the second shaft or interconnecting member 34 relative to the transmission housing 100. Second brake 92 is selectively engagable to connect the first shaft or interconnecting member 32 to a transmission housing 100 to restrict rotation of the first shaft or interconnecting member 32 relative to the transmission housing 100.

The transmission 10 is capable of transmitting torque from the input shaft or member 12 to the output shaft 14 in at least ten forward torque ratios and one reverse torque ratio. Each of the forward torque ratios and the reverse torque ratios are attained by engagement of one or more of the torque-transmitting mechanisms (i.e. first clutch 80, second clutch 82, third clutch 84, fourth clutch 86, first brake 90 and second brake 92). Those skilled in the art will readily understand that a different speed ratio is associated with each torque ratio. Thus, at least ten forward speed ratios and at least one reverse speed ratio may be attained by the transmission 10.

With continuing reference to FIGS. 1A and 1B, the location of the brakes 90, 92 and clutches 80, 82, 84, 86 along the input shaft or member 12, the fifth interconnecting member 60, the output shaft 14, and relative to the planetary gear sets 16, 18, 20, 22 will now be described. The first and second brakes 90, 92 are arranged coaxially with the fifth interconnecting member 60 and the first brake 90 is disposed axially rearward of the second brake 92. The torque converter 15 is disposed at a front end 10A of the transmission 10. The first brake 90 is supported by both a center support assembly 102 and a rear cover 104 of the transmission housing 100. The second brake 92 is supported by the center support assembly 102 of the transmission housing 100. The first brake 90 includes an actuating assembly 90A and a clutch pack 90B. The actuating assembly 90A of the first brake 90 includes a brake piston 106, a first apply chamber 108, a second apply chamber 110, and a dam chamber 112. The clutch pack 90B of the first brake 90 includes a plurality of clutch plates 114 secured to the center support 102. Upon pressurization of the apply chambers 108, 110, the brake piston 106 is forced to compress the clutch plates 114 with a plurality of clutch plates 116 secured to the second shaft or interconnecting member 34. The second brake 92 includes an actuating assembly 92A and a clutch pack 92B. The actuating assembly 92A of the second brake 92 includes a brake piston 118, an apply chamber 120, and a spring 122. The clutch pack 92B of the second brake 92 includes a plurality of clutch plates 124 secured to the center support 102. Upon pressurization of the apply chamber 120, the brake piston 118 is forced to engage the clutch plates 124 with a plurality of clutch plates 126 secured to the first shaft or interconnecting member 32.

The rear cover 104 of the transmission housing 100 further includes a first apply fluid passage 108A and a second apply fluid passage 110A. The first apply fluid passage 108A is in communication with the first apply chamber 108 of the first brake 90. The second apply fluid passage 110A is in communication with the second apply chamber 110 of the first brake 90.

The center support 102 of the transmission housing 100 further includes a first apply fluid passage 120A in communication with the first apply chamber 120 of the second brake 92.

The first, second, third, and fourth clutches 80, 82, 84, 86 are arranged coaxially with the input shaft or member 12. The first clutch 80, second clutch 82, third clutch 84, and fourth clutch 86 are disposed between a front wall 103 of the transmission housing 100 and the third planetary gear set 20. More specifically, the first clutch 80 is adjacent the front wall 103, the fourth clutch 86 is adjacent the third planetary gear set 20, and the second clutch 82 is disposed adjacent the first clutch 80. The third clutch 84 is disposed between the second and fourth clutches 82, 86.

The first clutch 80 includes an actuating assembly 80A and a clutch pack 80B. The actuating assembly 80A of the first clutch 80 includes an apply chamber 130, a dam chamber 132 and a piston 134. The actuating assembly 80A is supported by the input shaft or member 12. The clutch pack 80B includes a plurality of clutch plates 135 fixed for common rotation with the input shaft or member 12 interweaved with a plurality of clutch plates 137 fixed for common rotation with the fifth shaft or interconnecting member 60. The piston 134 of the actuating assembly 80A engages the clutch pack 80B to force the plurality of alternating friction disks together to interconnect the input shaft or member 12 with the ring gear 54 of the third planetary gear set 20.

The second clutch 82 includes an actuating assembly 82A and a clutch pack 82B. The actuating assembly 82A of the first clutch 82 includes an apply chamber 140, a dam chamber 142 and a piston 144. The actuating assembly 82A is supported by the seventh shaft or interconnecting member 64. The clutch pack 82B includes a plurality of clutch plates 145 fixed for common rotation with the seventh shaft or interconnecting member 64 interweaved with a plurality of clutch plates 147 fixed for common rotation with e sixth shaft or interconnecting member 62. The piston 144 of the actuating assembly 82A engages the clutch pack 82B to interconnect the seventh shaft or interconnecting member 64 with the carrier member 56 of the third planetary gear set 20.

The third clutch 84 includes an actuating assembly 84A and a clutch pack 84B. The actuating assembly 84A of the first clutch 84 includes an apply chamber 150, a dam chamber 152 and a piston 154. The actuating assembly 84A is supported by the seventh shaft or interconnecting member 64. The clutch pack 84B includes a plurality of clutch plates 155 fixed for common rotation with the seventh shaft or interconnecting member 64 interweaved with a plurality of clutch plates 157 fixed for common rotation with the fourth shaft or interconnecting member 50. The piston 154 of the actuating assembly 84A engages the clutch pack 84B to interconnect the seventh shaft or interconnecting member 64 with the sun gear 52 of the third planetary gear set 20 and the ring gear 44 of the second planetary gear set 18.

The fourth clutch 86 includes an actuating assembly 86A and a clutch pack 86B. The actuating assembly 86A of the first clutch 86 includes an apply chamber 160, a dam chamber 162 and a piston 164. The actuating assembly 86A is supported by the seventh shaft or interconnecting member 64. The clutch pack 86B includes a plurality of clutch plates 165 fixed for common rotation with the seventh shaft or interconnecting member 64 interweaved with a plurality of clutch plates 167 fixed for common rotation with the third shaft or interconnecting member 36. The piston 164 of the actuating assembly 86A engages the clutch pack 86B to interconnect the seventh shaft or interconnecting member 64 with the carrier member 28 of the first planetary gear set 16 and the ring gear 74 of the fourth planetary gear set 22.

Figures 2A, 2B:
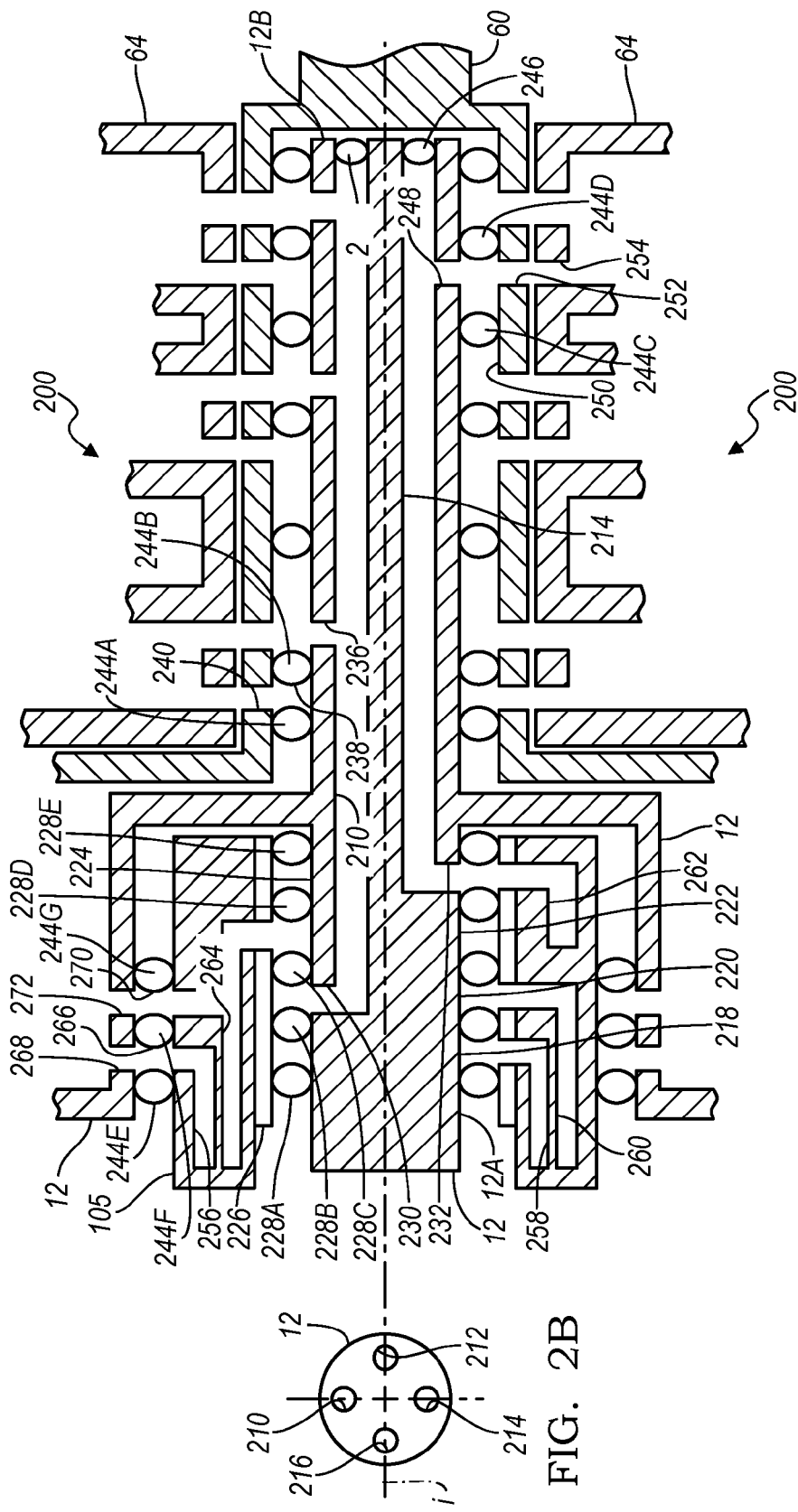
FIG. 2A is a schematic cross-sectional view of a portion of an embodiment of a ten speed transmission according to the present invention.
FIG. 2B is a schematic cross-sectional view of a shaft of a ten speed transmission according to the present invention.

Referring now to FIGS. 2A and 2B with continuing reference to FIGS. 1A and 1B, a portion of the transmission 10 is illustrated including the input shaft or member 12, the fifth shaft or interconnecting member 60, and the seventh shaft or interconnecting member 64 and further includes a hydraulic control circuit 200 in accordance with an embodiment of the present invention. The hydraulic control circuit 200 contains hydraulic fluid that is pressurized by a hydraulic fluid pump (not shown) and generates hydraulic control signals to actuate the first, second, third, and fourth clutches 80, 82, 84, 86 and first and second brakes 90, 92. The hydraulic control circuit 200 includes four bores disposed in the input shaft or member 12: a first bore 210, a second bore 212, a third bore 214, and a fourth bore 216. More specifically, the first, second, third, and fourth bores 210, 212, 214, 216 are disposed longitudinally in the input shaft or member 12. Each bore 210, 212, 214, 216 is disposed 90° from the adjacent bore 210, 212, 214, 216 as shown in FIG. 2B. The hydraulic control circuit 200 also includes four annular channels 218, 220, 222, 224 formed by a sleeve shaft 226, the input shaft or member 12, and a plurality of input shaft or member seals 228A-E. The sleeve shaft 226 is fixedly attached to the front support 105 of the transmission housing 100. The first annular channel 218 is defined by the outer surface of the input shaft or member 12, the inner surface of the sleeve shaft 226 and the side surfaces of a first input shaft or member seal 228A and a second input shaft or member seal 228B. The second annular channel 220 is defined by the outer surface of the input shaft or member 12, the inner surface of a sleeve shaft 226 and the side surfaces of the second input shaft or member seal 228B and a third input shaft or member seal 228C. The third annular channel 222 is defined by the outer surface of the input shaft or member 12, the inner surface of a sleeve shaft 226 and the side surfaces of the third input shaft or member seal 228C and the fourth input shaft or member seal 228D. The fourth annular channel 224 is defined by the outer surface of the input shaft or member 12, the inner surface of a sleeve shaft 226 and the side surfaces of the fourth input shaft or member seal 228D and the fifth input shaft or member seal 228E.

The four input shaft or member seals 228A-E are disposed coaxially with the input shaft or member 12 between the sleeve shaft 226 and the input shaft or member 12 and seals a first end 12A of the input shaft or member 12. The second and fourth annular channels 220, 224 communicate, respectively, with the first and third bores 210, 214 through first and third ports 230, 232 formed in the first end 12A of the input shaft or member 12.

The first bore 210 contains a first plug 234 fixedly disposed at a second end 12B of the input shaft or member 12 to seal the first bore 210. The first bore 210 communicates with the apply chamber 140 of the second clutch 82 (see FIGS. 1A and 1B) through a first apply port 236 of the input shaft or member 12, a fifth annular channel 238, a first apply side port 240 of the fifth shaft or interconnecting member 60, and a first apply side port 242 of the seventh shaft or interconnecting member 64. The fifth annular channel 238 is formed by the outer surface of the input shaft or member 12, the inner surface of the fifth shaft or interconnecting member 60 and the side surfaces of a first and a second intermediate seal 244A, 244B.

The third bore 214 contains a second plug 246 fixedly disposed at the second end 12B of the input shaft or member 12 to seal the third bore 214. The third bore 214 communicates with the apply chamber 160 of the fourth clutch 86 (see FIGS. 1A and 1B) through a second apply port 248 of the input shaft or member 12, a sixth annular channel 250, a second apply side port 252 of the fifth shaft or interconnecting member 60, and a second apply side port 254 of the seventh shaft or interconnecting member 64. The sixth annular channel 250 is formed by the outer surface of the input shaft or member 12, the inner surface of the fifth shaft or interconnecting member 60 and the side surfaces of a third and a fourth intermediate seal 244C, 244D.

The front support 105 of the transmission housing 100 includes a first, second, third, and fourth apply fluid passages 256, 258, 260, 262, and a dam fluid passage 264. The first apply fluid passage 256 communicates with the apply chamber 130 of the first clutch 80 (see FIGS. 1A and 1B) through a seventh annular channel 266 and a third apply port 268 of the input shaft or member 12. The seventh annular channel 266 is formed by the outer surface of the front support 105, the inner surface of the input shaft or member 12, and the side surfaces of a fifth and sixth intermediate seal 244E, 244F. The second apply fluid passage 258 communicates with the first annular channel 218. The third apply fluid passage 258 communicates with the second annular channel 220. The fourth apply fluid passage 262 communicates with the fourth annular channel 224. The dam fluid passage 264 communicates with the dam chamber 132 of the first clutch 80 (see FIGS. 1A and 1B) through an eighth annular channel 270 and a fourth apply port 272 of the input shaft or member 12. The eighth annular channel 270 is defined by the outer surface of the front support 105, the inner surface of the input shaft or member 12, and the side surfaces of the sixth and a seventh intermediate seal 244F, 244G.

Figures 3A, 3B:
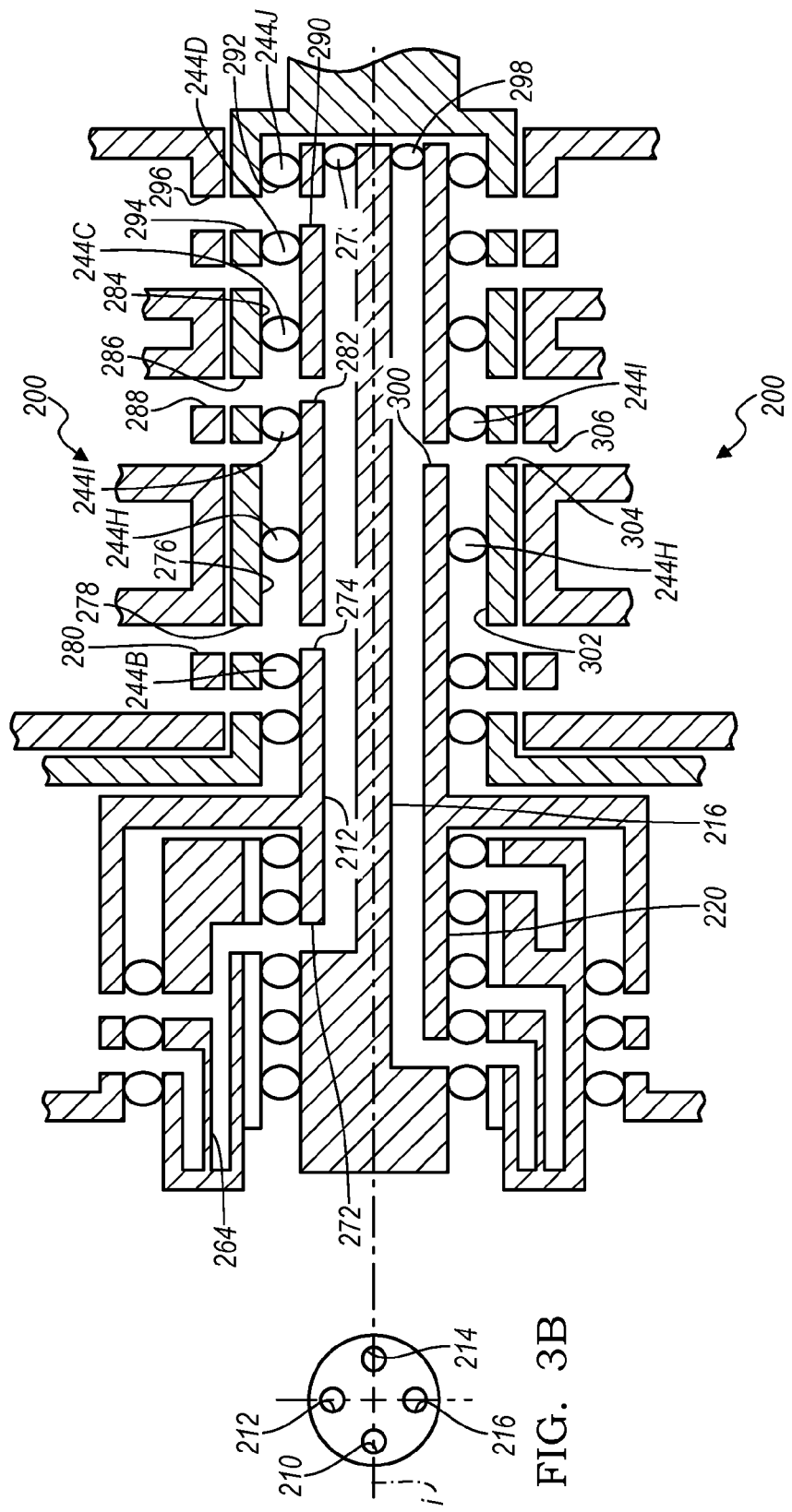
FIG. 3A is a schematic cross-sectional view of a portion of an embodiment of a ten speed transmission according to the present invention.
FIG. 3B is a schematic cross-sectional view of a shaft of a ten speed transmission according to the present invention.

Referring now to FIGS. 3A and 3B with continuing reference to FIGS. 1A and 1B, a portion of the transmission 10 is illustrated including the input shaft or member 12 turned 90° from the position shown in FIG. 2A, the fifth shaft or interconnecting member 60, and the seventh shaft or interconnecting member 64 and further includes a hydraulic control circuit 200 in accordance with an embodiment of the present invention.

The second bore 212 contains a third plug 273 fixedly disposed at the second end 12B of the input shaft or member 12 to seal the second bore 212. The second bore 220 communicates with the dam fluid passage 264 of the front support 105 through a first dam port 272 and the third annular channel 220. The second bore 220 also communicates with the dam chamber 142 of the second clutch 82 (see FIGS. 1A and 1B) through the second dam port 274, a ninth annular channel 276, a first dam side port 278 of the fifth shaft or interconnecting member 60, and a first dam side port 280 of the seventh shaft or interconnecting member 64. The ninth annular channel 276 is formed by the outer surface of the input shaft or member 12, the inner surface of the fifth shaft or interconnecting member 60 and the side surfaces of the second and a ninth intermediate seal 244B, 244H. The second bore 220 also communicates with the dam chamber 152 of the third clutch 84 (see FIGS. 1A and 1B) through the third dam port 282, a tenth annular channel 284, a second dam side port 286 of the fifth shaft or interconnecting member 60, and a second dam side port 288 of the seventh shaft or interconnecting member 64. The tenth annular channel 284 is formed by the outer surface of the input shaft or member 12, the inner surface of the fifth shaft or interconnecting member 60 and the side surfaces of a tenth and the third intermediate seal 244I, 244C. The second bore 220 also communicates with the dam chamber 162 of the fourth clutch 86 (see FIGS. 1A and 1B) through the third dam port 290, an eleventh annular channel 292, a third dam side port 294 of the fifth shaft or interconnecting member 60, and a third dam side port 296 of the seventh shaft or interconnecting member 64. The eleventh annular channel 292 is formed by the outer surface of the input shaft or member 12, the inner surface of the fifth shaft or interconnecting member 60 and the side surfaces of the fourth and an eleventh intermediate seal 244D, 244J.

The fourth bore 216 contains a fourth plug 298 fixedly disposed at the second end 12B of the input shaft or member 12 to seal the fourth bore 216. The fourth bore 214 communicates with the apply chamber 150 of the third clutch 84 (see FIGS. 1A and 1B) through a third apply port 300 of the input shaft or member 12, a twelfth annular channel 302, a third apply side port 304 of the fifth shaft or interconnecting member 60, and a third apply side port 306 of the seventh shaft or interconnecting member 64. The twelfth annular channel 302 is formed by the outer surface of the input shaft or member 12, the inner surface of the fifth shaft or interconnecting member 60 and the side surfaces of the ninth and tenth intermediate seal 244H, 244I.

Figures 4A, 4B:
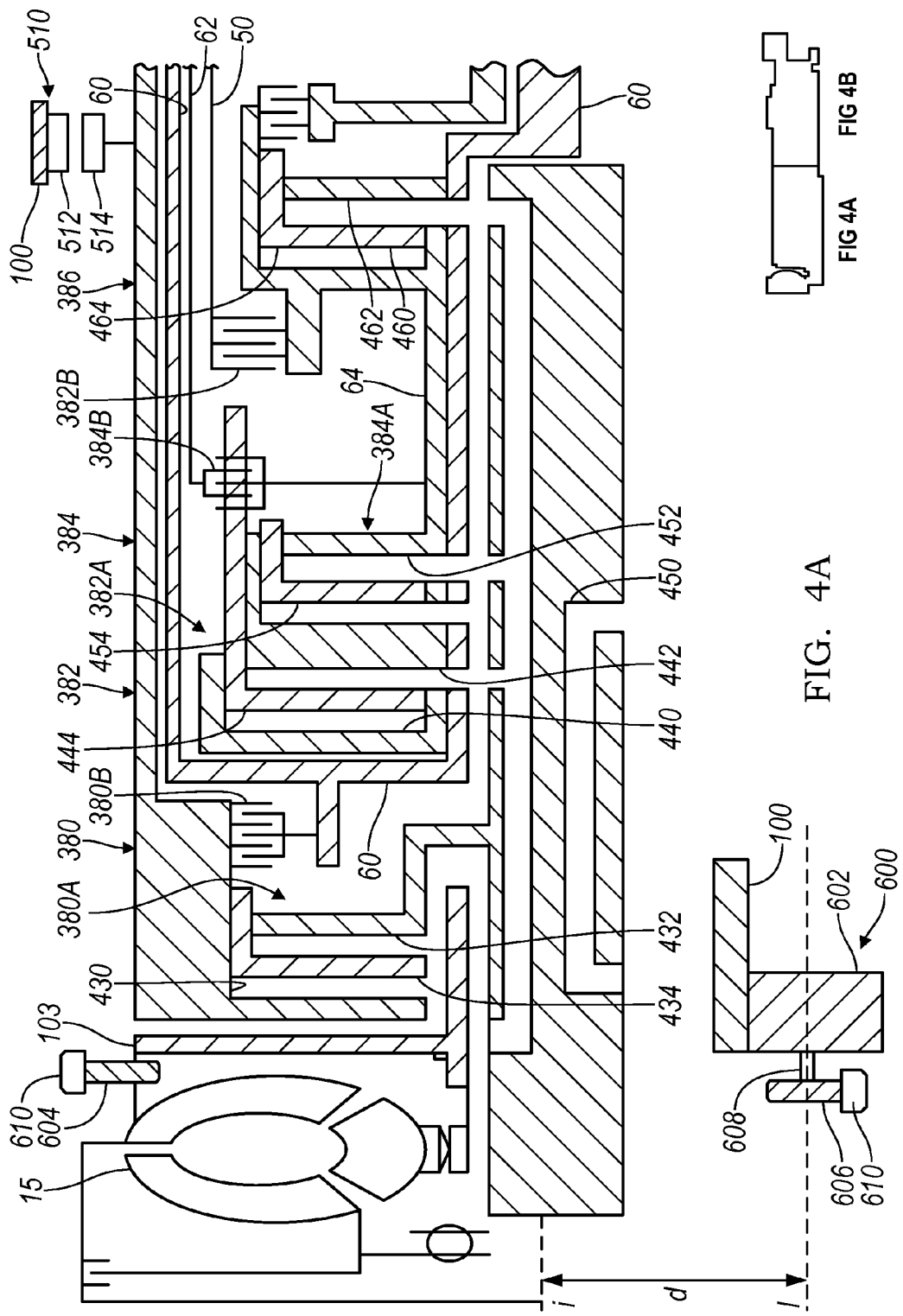
FIG. 4A is a schematic cross-sectional view of a front portion of an embodiment of a ten speed transmission according to the present invention.
FIG. 4B is a schematic cross-sectional view of a rear portion of an embodiment of a ten speed transmission according to the present invention.
Figure 4B:
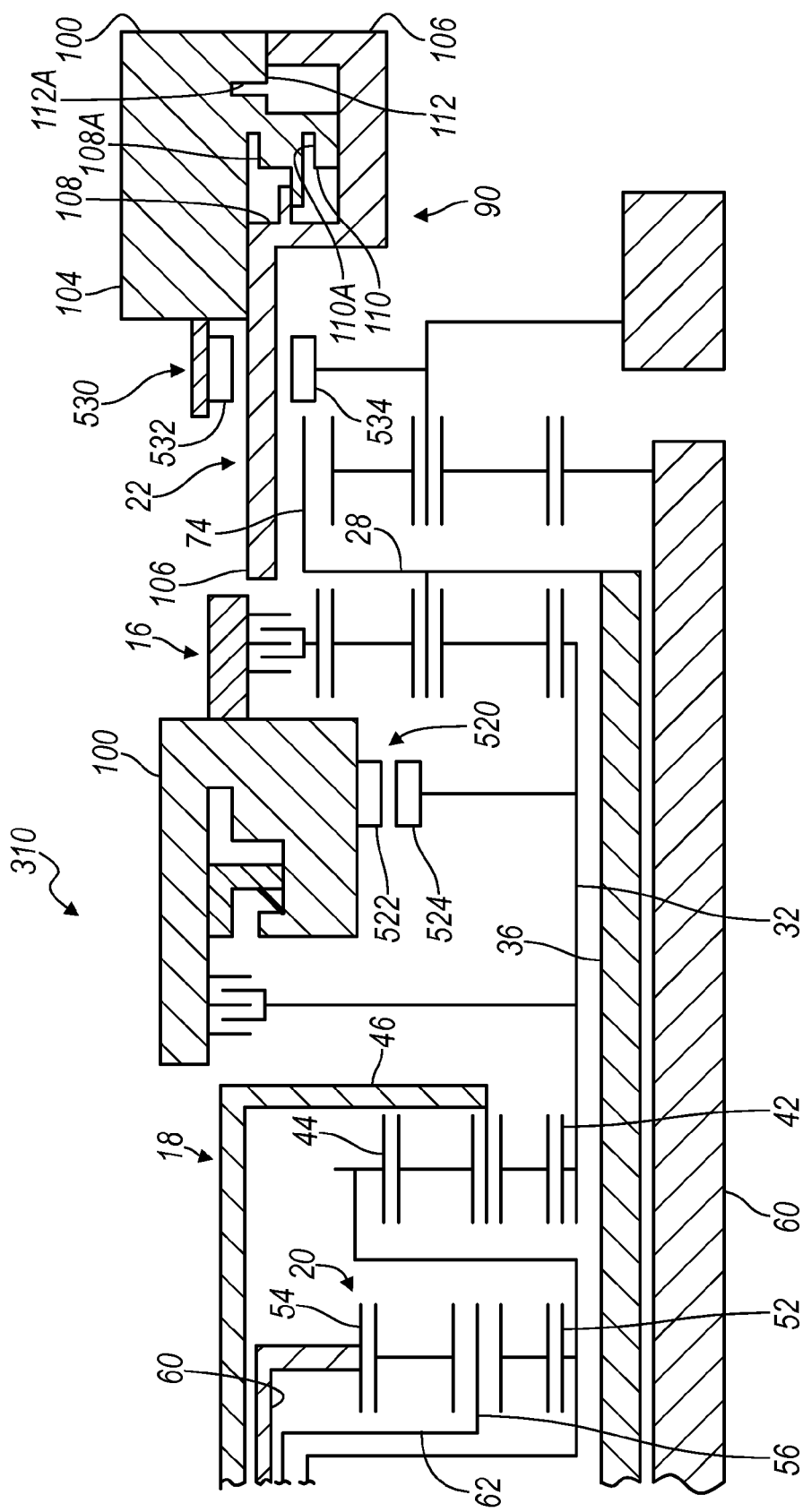

Referring now to FIGS. 4A and 4B, another example of a transmission 310 of the present invention is illustrated and will now be described. In FIGS. 4A and 4B, the reference numbers from FIGS. 1A and 1B are carried over where appropriate. The first, second, third, and fourth clutches 380, 382, 384, 386 are arranged coaxially with the input shaft or member 12. The first clutch 380, second clutch 382, third clutch 384, and fourth clutch 386 are disposed between the front wall 103 of the transmission housing 100 and the third planetary gear set 20. More specifically, the first clutch 380 is adjacent the front wall 103, the fourth clutch 386 is adjacent the third planetary gear set 20, and the second clutch 382 is disposed adjacent the first clutch 380. The third clutch 384 is disposed between the second and fourth clutches 382, 386.

The first clutch 380 includes an actuating assembly 380A and a clutch pack 380B. The actuating assembly 380A of the first clutch 380 includes an apply chamber 430, a dam chamber 432 and a piston 434. The actuating assembly 380A is supported by the input shaft or member 12. The clutch pack 380B includes a plurality of alternating friction disks or rings fixed for common rotation with either the input shaft or member 12 or the fifth shaft or interconnecting member 60. The piston 434 of the actuating assembly 380A engages the clutch pack 380B to force the plurality of alternating friction disks together to interconnect the input shaft or member 12 with the ring gear 54 of the third planetary gear set 20.

The second clutch 382 includes an actuating assembly 382A and a clutch pack 382B. The actuating assembly 382A of the first clutch 382 includes an apply chamber 440, a dam chamber 442 and a piston 444. The actuating assembly 382A is supported by the seventh shaft or interconnecting member 64. The clutch pack 382B includes a plurality of alternating friction disks or rings fixed for common rotation with either the seventh shaft or interconnecting member 64 or the fourth shaft or interconnecting member 50. The piston 444 of the actuating assembly 382A engages the clutch pack 382B to interconnect the seventh shaft or interconnecting member 64 with the sun gear 52 of the third planetary gear set 20 and the ring gear 44 of the second planetary gear set 18.

The third clutch 384 includes an actuating assembly 384A and a clutch pack 384B. The actuating assembly 384A of the first clutch 384 includes an apply chamber 450, a dam chamber 452 and a piston 454. The actuating assembly 384A is supported by the seventh shaft or interconnecting member 64. The clutch pack 384B includes a plurality of alternating friction disks or rings fixed for common rotation with either the seventh shaft or interconnecting member 64 or the sixth shaft or interconnecting member 62. The piston 454 of the actuating assembly 384A engages the clutch pack 384B to interconnect the seventh shaft or interconnecting member 64 with the carrier member 56 of the third planetary gear set. The clutch pack 384A is disposed such that the piston 444 of the actuating assembly 382A of the second clutch 382 passes through the clutch pack 384A.

The fourth clutch 386 includes an actuating assembly 386A and a clutch pack 386B. The actuating assembly 386A of the first clutch 386 includes an apply chamber 460, a dam chamber 462 and a piston 464. The actuating assembly 386A is supported by the seventh shaft or interconnecting member 64. The clutch pack 386B includes a plurality of alternating friction disks or rings fixed for common rotation with either the seventh shaft or interconnecting member 64 or the third shaft or interconnecting member 36. The piston 464 of the actuating assembly 386A engages the clutch pack 386B to interconnect the seventh shaft or interconnecting member 64 with the carrier member 28 of the first planetary gear set 16 and the ring gear 74 of the fourth planetary gear set 22.

With continuing reference to FIGS. 4A and 4B, the locations for three speed sensor assemblies 510, 520, 530 in the transmission 310 will now be described. The speed sensor assemblies 510, 520, 530 each include a speed sensor 512, 522, 532 and a speed sensor ring 514, 524, 534. The speed sensors 512, 522, 532 are fixedly attached to the transmission housing 100. The speed sensors 512, 522, 532 are conventional speed sensors such as Hall Effect sensors or variable reluctance sensors and the like. The speed sensor rings 514, 524, 534 are in close proximity to the speed sensors 512, 522, 532 and are fixedly attached to one of the rotatable shafts or members of transmission 310. The speed sensors 512, 522, 532 detect the presence of the respective speed sensor ring 514, 523, 534 to count the revolutions of the shaft or interconnecting member to which the speed sensor ring 514, 524, 534 is attached. Alternatively, the speed sensor rings 514, 524, 534 are magnetic strips or toothed portions of shafts having magnetic material formed in the rotatable shafts or members of transmission 310.

For example, the first speed sensor 512 is fixedly attached to the transmission housing 100 and the first speed sensor ring 514 is fixedly disposed on the input shaft or member 12. The second speed sensor 522 is fixedly disposed on center support 102 of the transmission housing 100 and the second speed ring 524 is fixedly disposed on the first shaft or interconnecting member 32. The third speed sensor 532 is fixedly disposed on the rear cover 104 transmission housing 100 and the third speed sensor ring 534 is fixedly disposed on the output shaft 14. Alternatively, the third speed sensor 532 is mounted to the inside surface of the piston 106 of the first brake 90.

With continuing reference to FIGS. 4A and 4B, the transmission 310 includes an off-axis oil pump 600. The off-axis fluid pump assembly 600 includes a transmission fluid pump 602, a drive gear or pulley member 604, a driven gear or pulley member 606, a pump shaft 608 and a chain or belt 610. The transmission fluid pump 602 is fixedly attached to the transmission housing 100 or a similar stationary member along an axis "I" that is offset a predefined radial distance "d" from the axis "i" of the input shaft or member 12. The drive gear or pulley member 604 is fixedly attached for common rotation with the torque converter 15. The driven gear or pulley member 606 is fixedly connected for common rotation with the pump shaft 608. The chain or belt 610 engages both the drive gear or pulley member 604 and the driven gear or pulley member 606 to transfer driving torque from the input shaft or member 12 to the pump shaft 608. The pump shaft 608 transfers the driving torque produced in the chain or belt 610 to fluid pump 602. A stepped ratio may be used between the drive gear or pulley member 604 and the driven gear or pulley member 606 to reduce the amount of energy transferred to the transmission fluid pump 602 thus resulting in a more efficient transmission 10. The fluid pump assembly 600 provides fluid pressure and flow for transmission 10 function. Driving the fluid pump assembly 600 by a ratio connection allows the transmission 10 to more efficiently provide fluid pressure and flow.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-speed transmission comprising:
   a transmission housing having a front portion, a center portion, and a rear portion;
   a first, a second, a third, and a fourth planetary gear set each having a first, a second, and a third member;
   an input member including an outer surface and a first, a second, a third, and a fourth bore, and wherein the input member is rotatably supported by the transmission housing, the input member is continuously interconnected with the second member of the second planetary gear set, the first, second, third and fourth bores are disposed parallel to a longitudinal axis of the input member, the first, third, and fourth bores are apply bores, and the second bore is a dam bore;
   an output member rotatably supported by the transmission housing, the output member continuously interconnected to the second member of the fourth planetary gear set;
   four interconnecting members each continuously interconnecting one of the first, second, and third members of one of the planetary gear sets with another of the first, second, and third members of another one of the planetary gear sets;
   an intermediate member rotatably supported by one of the four interconnecting members;
   a first and a second torque transmitting mechanism, each selectively interconnecting at least one of the first, second, and third members of one of the first, second, third, and fourth planetary gear sets with the transmission housing;
   a third torque transmitting mechanism selectively interconnecting at least one of the first, second, and third members of one of the first, second, third, and fourth planetary gear sets with another one of the first, second, and third members of one of the first, second, third, and fourth planetary gear sets;
   a fourth, a fifth, and a sixth torque transmitting mechanism, each selectively interconnecting at least one of the first, second, and third members of one of the first, second, third, and fourth planetary gear sets with the intermediate member; and
   wherein the torque transmitting mechanisms are selectively engageable in combinations of no more than three to establish ten forward speed ratios and at least one reverse speed ratio between the input member and the output member, each of the torque transmitting mechanisms include a clutch pack and an actuating assembly, the actuating assembly of the first torque transmitting mechanism is supported by the center portion of the transmission housing, and the actuating assembly of the second torque transmitting mechanism is supported by the rear portion of the transmission housing, and the intermediate member rotates freely with respect to the first, second, and third members of each of the first, second, third, and fourth planetary gear sets when each of the fourth, fifth, and sixth torque transmitting mechanisms are disengaged.

2. The multi-speed transmission of claim 1 wherein a first of the four interconnecting members continuously interconnects the first member of the first planetary gear set with the first member of the second planetary gear set, a second of the four interconnecting members continuously interconnects the second member of the first planetary gear set with the third member of the fourth planetary gear set, a third of the four interconnecting members continuously interconnects the third member of the second planetary gear set with the first member of the third planetary gear set, and a fourth of the four interconnecting members continuously interconnects the third member of the third planetary gear set with the first member of the fourth planetary gear set.

3. The multi-speed transmission of claim 2 wherein the actuating assembly of the first torque transmitting mechanism includes a piston, an apply chamber, and a dam spring, the actuating assembly of the second torque transmitting mechanism includes a piston, a first apply chamber, a second apply chamber, and a dam chamber, the actuating assemblies of the third, fourth, fifth, and sixth torque transmitting mechanisms each include a piston, an apply chamber, and a dam chamber.

4. The multi-speed transmission of claim 3 wherein the center portion of the transmission housing includes an apply passage, the apply passage of the center portion is in communication with the apply chamber of the first of the six torque transmitting mechanisms, the rear portion of the transmission housing includes a first apply passage, a second apply passage, and a dam passage, the first apply passage of the rear portion of the transmission housing is in communication with the first apply chamber of the second torque transmitting mechanism, the second apply passage of the rear portion of the transmission housing is in communication with the second apply chamber of the second torque transmitting mechanism, and the dam passage of the rear portion of the transmission housing is in communication with the dam chamber of the second torque transmitting mechanism.

5. The multi-speed transmission of claim 3 wherein the front portion of the transmission housing includes a first, second, third, and fourth apply passage and a dam passage, the fourth apply passage is in communication with the apply chamber of the third torque transmitting mechanism, and the dam passage is in communication with the dam chamber of the third torque transmitting mechanism.

6. The multi-speed transmission of claim 5 wherein the input member includes a first, second, and third apply passage and a dam passage, the first apply passage of the input member is in communication with each of the first apply passage of the front portion of the transmission housing and the apply chamber of the fourth torque transmitting mechanism, the second apply passage of the input member is in communication with each of the second apply passage of the front portion of the transmission housing and the apply chamber of the fifth torque transmitting mechanism, the third apply passage of the input member is in communication with each of the third apply passage of the front portion of the transmission housing and the apply chamber of the sixth torque transmitting mechanism, and the dam passage of the input member is in communication with each of the dam passage of the front portion of the transmission housing and the dam chambers of each of the fourth, fifth, and sixth torque transmitting mechanism.

7. The multi-speed transmission of claim 5 wherein the input member includes a first, a second, and a third clutch port, the first clutch port is in communication with the apply chamber of the fourth torque transmitting mechanism and the first bore of the input member, the second clutch port is in communication with the apply chamber of the fifth torque-transmitting mechanism and the second bore of the input member, the third clutch port is in communication with the apply chamber of the sixth torque-transmitting mechanism and the third bore of the input member, and a first, second, and third dam ports in communication with the dam chambers of the fourth, fifth, and sixth of the six torque transmitting mechanisms, respectively, and the fourth bore of the input member.

8. The multi-speed transmission of claim 7 further including:
a sleeve shaft supported by the front portion of the transmission housing, and wherein the sleeve shaft has an inner surface;
a plurality of input member seals; and
a first annular channel, a second annular channel, a third annular channel, and a fourth annular channel wherein the annular channels are defined by the inner surface of the sleeve shaft, the outer surface of the input member, and the plurality of input member seals, and
wherein the first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port.

9. The multi-speed transmission of claim 3 further including a first, second, and third speed sensor assembly each having a sensor and a ring, the sensor of the first speed sensor assembly is disposed on the transmission housing and the ring of the first speed sensor assembly is fixed to the input member, the sensor of the second speed sensor assembly is disposed on the center portion of the transmission housing and the ring of the second speed sensor assembly is fixed to the first of the four interconnecting members, and the sensor of the third speed sensor assembly is disposed on the rear portion of the transmission housing and the ring of the third speed sensor assembly is fixed to the output member.

10. The multi-speed transmission of claim 1 wherein the first torque transmitting mechanism is selectively engageable to interconnect at least one of the first member of the first planetary gear set and the first member of the second planetary gear set with the transmission housing, the second torque transmitting mechanism is selectively engageable to interconnect the third member of the first planetary gear set with the transmission housing, the third torque transmitting mechanism is selectively engageable to interconnect at least one of the second member of the second planetary gear set and the input member with the first member of the fourth planetary gear set, the fourth torque transmitting mechanism is selectively engageable to interconnect at least one of the third member of the second planetary gear set and the first member of the third planetary gear set with the intermediate member, the fifth torque transmitting mechanism is selectively engageable to interconnect the second member of the third planetary gear set with the intermediate member, and the sixth torque transmitting mechanism is selectively engageable to interconnect at least one of the second member of the first planetary gear set and the third member of the fourth planetary gear set with the intermediate member.

11. The multi-speed transmission of claim 1 further including a hydraulic fluid pump fixed to the transmission housing and drivingly connected to a torque converter pump.

12. A multi-speed transmission comprising:
a transmission housing having a front portion, a center portion, and a rear portion;
a first, a second, a third, and a fourth planetary gear set each having a first, a second, and a third member;
an input member including an outer surface and a first, second, and third apply passage and a dam passage, and wherein the input member is rotatably supported by the transmission housing, the input member is continuously interconnected with the second member of the second planetary gear set, the first, second, and third apply passage and a dam passage are disposed parallel to a longitudinal axis of the input member;
an output member rotatably supported by the transmission housing, the output member continuously interconnected to the second member of the fourth planetary gear set;

four interconnecting members each continuously interconnecting one of the first, second, and third members of one of the planetary gear sets with another of the first, second, and third members of another one of the planetary gear sets;
an intermediate member rotatably supported by one of the four interconnecting members;
a first and a second torque transmitting mechanism, each selectively interconnecting at least one of the first, second, and third members of one of the first, second, third, and fourth planetary gear sets with the transmission housing;
a third torque transmitting mechanism selectively interconnecting at least one of the first, second, and third members of one of the first, second, third, and fourth planetary gear sets with another one of the first, second, and third members of one of the first, second, third, and fourth planetary gear sets;
a fourth, a fifth, and a sixth torque transmitting mechanism, each selectively interconnecting at least one of the first, second, and third members of one of the first, second, third, and fourth planetary gear sets with the intermediate member; and
wherein the torque transmitting mechanisms are selectively engageable in combinations of three to establish ten forward speed ratios and at least one reverse speed ratio between the input member and the output member, the first of the six torque transmitting mechanisms is supported by the center portion of the transmission housing, and the second of the six torque transmitting mechanisms is supported by the rear portion of the transmission housing, and the intermediate member rotates freely with respect to the first, second, and third members of each of the first, second, third, and fourth planetary gear sets when each of the fourth, fifth, and sixth torque transmitting mechanisms are disengaged.

13. The multi-speed transmission of claim 12 wherein a first of the four interconnecting members continuously interconnects the first member of the first planetary gear set with the first member of the second planetary gear set, a second of the four interconnecting members continuously interconnects the second member of the first planetary gear set with the third member of the fourth planetary gear set, a third of the four interconnecting members continuously interconnects the third member of the second planetary gear set with the first member of the third planetary gear set, and a fourth of the four interconnecting members continuously interconnects the third member of the third planetary gear set with the first member of the fourth planetary gear set.

14. The multi-speed transmission of claim 13 wherein each of the six torque transmitting mechanisms include a clutch pack and an actuating assembly, the actuating assembly of the first torque transmitting mechanism includes a piston, an apply chamber, and a dam spring, the actuating assembly of the second torque transmitting mechanism includes a piston, a first apply chamber, a second apply chamber, and a dam chamber, the actuating assemblies of the third, fourth, fifth, and sixth torque transmitting mechanisms each include a piston, an apply chamber, and a dam chamber.

15. The multi-speed transmission of claim 14 wherein the center portion of the transmission housing includes an apply passage, the apply passage of the center portion is in communication with the apply chamber of the first of the six torque transmitting mechanisms, the rear portion of the transmission housing includes a first apply passage, a second apply passage, and a dam passage, the first apply passage of the rear portion of the transmission housing is in communication with the first apply chamber of the second torque transmitting mechanism, the second apply passage of the rear portion of the transmission housing is in communication with the second apply chamber of the second torque transmitting mechanism, and the dam passage of the rear portion of the transmission housing is in communication with the dam chamber of the second torque transmitting mechanism.

16. The multi-speed transmission of claim 14 wherein the front portion of the transmission housing includes a first, second, third, and fourth apply passage and a dam passage, the fourth apply passage is in communication with the apply chamber of the third torque transmitting mechanism, and the dam passage is in communication with the dam chamber of the third torque transmitting mechanism.

17. The multi-speed transmission of claim 16 wherein the first apply passage of the input member is in communication with each of the first apply passage of the front portion of the transmission housing and the apply chamber of the fourth torque transmitting mechanism, the second apply passage of the input member is in communication with each of the second apply passage of the front portion of the transmission housing and the apply chamber of the fifth torque transmitting mechanism, the third apply passage of the input member is in communication with each of the third apply passage of the front portion of the transmission housing and the apply chamber of the sixth torque transmitting mechanism, and the dam passage of the input member is in communication with each of the dam passage of the front portion of the transmission housing and the dam chambers of each of the fourth, fifth, and sixth torque transmitting mechanism.

18. The multi-speed transmission of claim 16 wherein the input member includes a first, a second, a third, and a fourth bore and a first, a second, and a third clutch port, the first, second, third and fourth bores are disposed parallel to a longitudinal axis of the input member, the first clutch port is in communication with the apply chamber of the fourth torque transmitting mechanism and the first bore of the input member, the second clutch port is in communication with the apply chamber of the fifth torque-transmitting mechanism and the second bore of the input member, the third clutch port is in communication with the apply chamber of the sixth torque-transmitting mechanism and the third bore of the input member, and a first, second, and third dam ports in communication with the dam chambers of the fourth, fifth, and sixth of the six torque transmitting mechanisms, respectively, and the fourth bore of the input member.

19. The multi-speed transmission of claim 18 further including:
 a sleeve shaft supported by the front portion of the transmission housing;
 a plurality of input member seals; and
 a first annular channel, a second annular channel, a third annular channel, and a fourth annular channel wherein the annular channels are defined by the inner surface of the sleeve shaft, the outer surface of the input member, and the plurality of input member seals, and
 wherein the first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port.

20. The multi-speed transmission of claim 16 further including a hydraulic fluid pump fixed to the transmission housing and drivingly connected to a torque converter pump.

21. The multi-speed transmission of claim 16 further including a first, second, and third speed sensor assembly each having a sensor and a ring, the sensor of the first speed sensor assembly is disposed on the transmission housing and the ring of the first speed sensor assembly is fixed to the input member, the sensor of the second speed sensor assembly is disposed on the center portion of the transmission housing and the ring of the second speed sensor assembly is fixed to the first of the four interconnecting members, and the sensor of the third speed sensor assembly is disposed on the rear portion of the transmission housing and the ring of the third speed sensor assembly is fixed to the output member.

22. The multi-speed transmission of claim 12 wherein the first torque transmitting mechanism is selectively engageable to interconnect at least one of the first member of the first planetary gear set and the first member of the second planetary gear set with the transmission housing, the second torque transmitting mechanism is selectively engageable to interconnect the third member of the first planetary gear set with the transmission housing, the third torque transmitting mechanism is selectively engageable to interconnect at least one of the second member of the second planetary gear set and the input member with the first member of the fourth planetary gear set, the fourth torque transmitting mechanism is selectively engageable to interconnect at least one of the third member of the second planetary gear set and the first member of the third planetary gear set with the intermediate member, the fifth torque transmitting mechanism is selectively engageable to interconnect the second member of the third planetary gear set with the intermediate member, and the sixth torque transmitting mechanism is selectively engageable to interconnect at least one of the second member of the first planetary gear set and the third member of the fourth planetary gear set with the intermediate member.

23. A multi-speed transmission comprising:
a transmission housing having a front portion, a center portion, and a rear portion;
a first, a second, a third, and a fourth planetary gear set each having a first, a second, and a third member;
an input member including an outer surface and a first, second, and third apply passage and a dam passage, and wherein the input member is rotatably supported by the transmission housing, the input member is continuously interconnected with the second member of the second planetary gear set, the first, second, and third apply passage and a dam passage are disposed parallel to a longitudinal axis of the input member;
an output member rotatably supported by the transmission housing, the output member continuously interconnected to the second member of the fourth planetary gear set;
four interconnecting members each continuously interconnecting one of the first, second, and third members of one of the planetary gear sets with another of the first, second, and third members of another one of the planetary gear sets;
an intermediate member rotatably supported by one of the four interconnecting members;
six torque transmitting mechanisms each having a clutch pack and an actuating assembly, the actuating assembly of the first of the six torque transmitting mechanisms includes a piston, an apply chamber, and a dam spring, the actuating assembly of the second of the six torque transmitting mechanisms includes a piston, a first apply chamber, a second apply chamber, and a dam chamber, the actuating assemblies of the third, fourth, fifth, and sixth of the six torque transmitting mechanisms each include a piston, an apply chamber, and a dam chamber, and wherein the six torque transmitting mechanisms each selectively interconnect at least one of the first, second, and third members of one of the planetary gear sets with at least another one of the first members, second members, third members of one of the planetary gear sets, the intermediate member, or the transmission housing; and
wherein the torque transmitting mechanisms are selectively engageable in combinations of three to establish ten forward speed ratios and at least one reverse speed ratio between the input member and the output member, the first of the six torque transmitting mechanisms is supported by the center portion of the transmission housing, and the second of the six torque transmitting mechanisms is supported by the center portion of the transmission housing, and the intermediate member rotates freely with respect to the first, second, and third members of each of the first, second, third, and fourth planetary gear sets when each of the fourth, fifth, and sixth of the six torque transmitting mechanisms are disengaged.

24. The multi-speed transmission of claim 23 wherein a first of the four interconnecting members continuously interconnects the first member of the first planetary gear set with the first member of the second planetary gear set, a second of the four interconnecting members continuously interconnects the second member of the first planetary gear set with the third member of the fourth planetary gear set, a third of the four interconnecting members continuously interconnects the third member of the second planetary gear set with the first member of the third planetary gear set, and a fourth of the four interconnecting members continuously interconnects the third member of the third planetary gear set with the first member of the fourth planetary gear set.

25. The multi-speed transmission of claim 24 wherein the first of the six torque transmitting mechanisms is selectively engageable to interconnect at least one of the first member of the first planetary gear set and the first member of the second planetary gear set with the transmission housing, the second of the six torque transmitting mechanisms is selectively engageable to interconnect the third member of the first planetary gear set with the transmission housing, a third of the six torque transmitting mechanisms is selectively engageable to interconnect at least one of the second member of the second planetary gear set and the input member with the first member of the fourth planetary gear set, a fourth of the six torque transmitting mechanisms is selectively engageable to interconnect at least one of the third member of the second planetary gear set and the first member of the third planetary gear set with the intermediate member, a fifth of the six torque transmitting mechanisms is selectively engageable to interconnect the second member of the third planetary gear set with the intermediate member, and a sixth of the six torque transmitting mechanisms is selectively engageable to interconnect at least one of the second member of the first planetary gear set and the third member of the fourth planetary gear set with the intermediate member.

26. The multi-speed transmission of claim 25 further including a hydraulic fluid pump fixed to the transmission housing and drivingly connected to a torque converter pump.

27. The multi-speed transmission of claim 25 further including a first, second, and third speed sensor assembly each having a sensor and a ring, the sensor of the first speed sensor assembly is disposed on the transmission housing and the ring of the first speed sensor assembly is fixed to the input member, the sensor of the second speed sensor assembly is disposed on the center portion of the transmission housing and the ring of the second speed sensor assembly is fixed to the first of the four interconnecting members, and the sensor of the third speed sensor assembly is disposed on the rear portion of the transmission housing and the ring of the third speed sensor assembly is fixed to the output member.

28. The multi-speed transmission of claim 23 wherein the center portion of the transmission housing includes an apply passage, the apply passage of the center portion is in communication with the apply chamber of the first of the six torque transmitting mechanisms, the rear portion of the transmission housing includes a first apply passage, a second apply passage, and a dam passage, the first apply passage of the rear portion of the transmission housing is in communication with the first apply chamber of the second of the six torque transmitting mechanisms, the second apply passage of the rear portion of the transmission housing is in communication with the second apply chamber of the second of the six torque transmitting mechanisms, and the dam passage of the rear portion of the transmission housing is in communication with the dam chamber of the second of the six torque transmitting mechanisms.

29. The multi-speed transmission of claim 23 wherein the front portion of the transmission housing includes a first, second, third, and fourth apply passage and a dam passage, the fourth apply passage is in communication with the apply chamber of the third of the six torque transmitting mechanisms, and the dam passage is in communication with the dam chamber of the third of the six torque transmitting mechanisms.

30. The multi-speed transmission of claim 29 wherein the input member includes the first apply passage of the input member is in communication with each of the first apply passage of the front portion of the transmission housing and the apply chamber of the fourth of the six torque transmitting mechanisms, the second apply passage of the input member is in communication with each of the second apply passage of the front portion of the transmission housing and the apply chamber of the fifth of the six torque transmitting mechanisms, the third apply passage of the input member is in communication with each of the third apply passage of the front portion of the transmission housing and the apply chamber of the sixth of the six torque transmitting mechanisms, and the dam passage of the input member is in communication with each of the dam passage of the front portion of the transmission housing and the dam chambers of each of the fourth, fifth, and sixth of the six torque transmitting mechanisms.

31. The multi-speed transmission of claim 29 wherein the input member includes a first, a second, a third, and a fourth bore disposed parallel to a longitudinal axis of the input member, a first clutch port in communication with the apply chamber of the fourth of the six torque-transmitting mechanisms and the first bore of the input member, a second clutch port in communication with the apply chamber of the fifth of the six torque-transmitting mechanisms and the second bore of the input member, a third clutch port in communication with the apply chamber of the sixth of the six torque-transmitting mechanisms and the third bore of the input member, and a first, second, and third dam ports in communication with the dam chambers of the fourth, fifth, and sixth of the six torque transmitting mechanisms, respectively, and the fourth bore of the input member.

32. The multi-speed transmission of claim 31 further including:
a sleeve shaft supported by the front portion of the transmission housing;
a plurality of input member seals; and
a first annular channel, a second annular channel, a third annular channel, and a fourth annular channel wherein the annular channels are defined by the inner surface of the sleeve shaft, the outer surface of the input member, and the plurality of input member seals, and
wherein the first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port.

* * * * *